July 28, 1942.  S. A. BROWNSEY  2,291,144
REVERSIBLE HOE
Filed Jan. 6, 1941
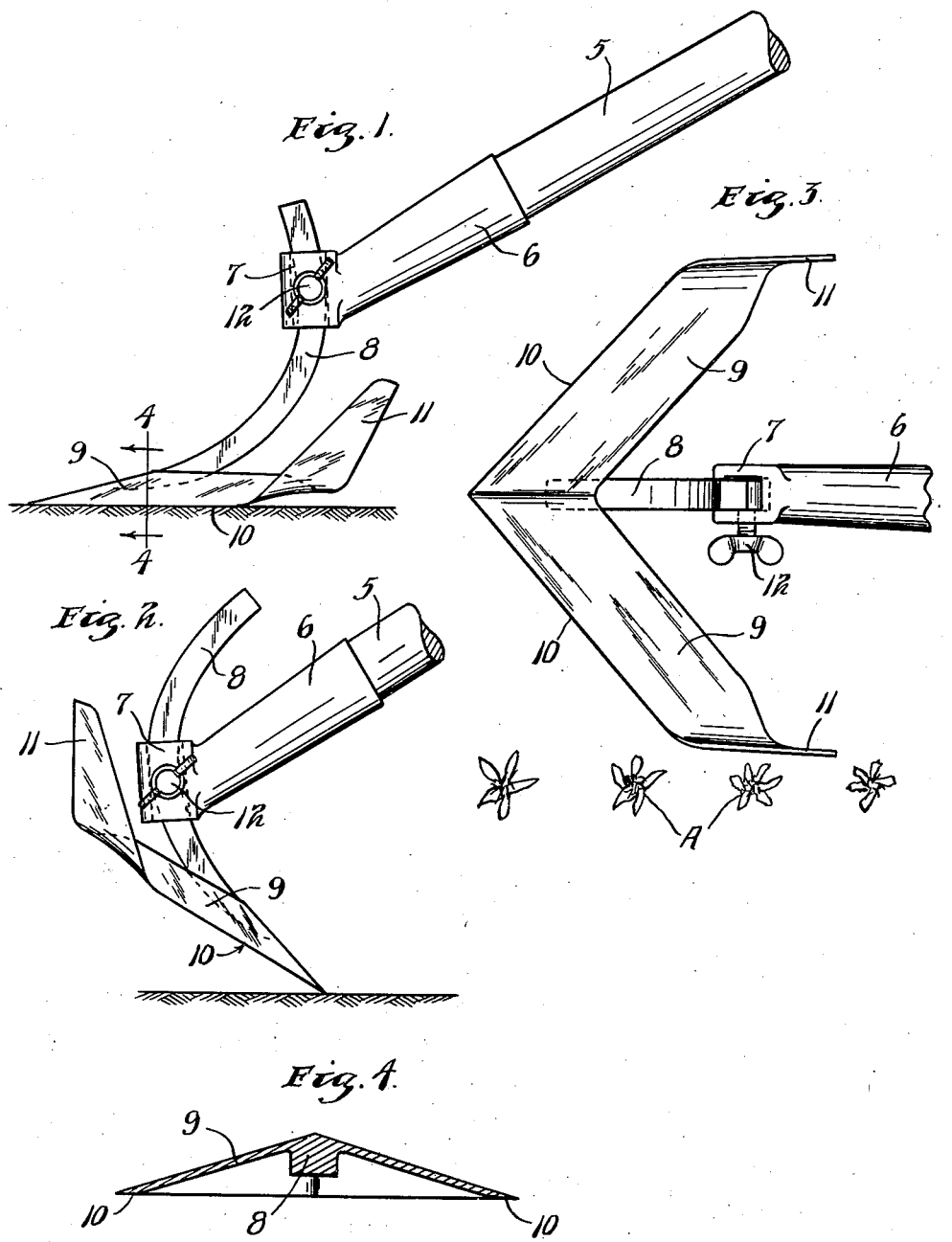
INVENTOR.
SIDNEY A. BROWNSEY.
BY HIS ATTORNEYS.
Williamson & Williamson Patented July 28, 1942

2,291,144

UNITED STATES PATENT OFFICE 2,291,144

REVERSIBLE HOE

Sidney A. Brownsey, Wadena, Minn.

Application January 6, 1941, Serial No. 373,209

1 Claim. (Cl. 97—69)

This invention relates to ground working implements in the nature of reversible hoes.

It is one of the objects of the invention to provide a novel and improved hoe including a handle and a blade having a cutting edge, the blade being capable of being so attached to the handle that the cutting edge of the blade can be disposed so that a cutting action will be obtained when the handle is pushed forwardly and the blade being capable of being so attached that the cutting edge will cut when the handle is pulled rearwardly.

Another object is to provide a novel and improved hoe of cheap and simple construction including a handle and a cutting blade and means for attaching the handle to the blade in such relation that the handle can be set at various angles relative to the blade to adjust the hoe to suit the height requirements of various individuals using the same depending on what work is to be done with the hoe.

Another object is to provide a novel and improved ground working blade which is capable of many uses.

The objects and advantages of the invention will more fully appear from the following description made in connection with the accompanying drawing wherein like reference characters refer to the same or similar parts throughout the several views and in which—

Fig. 1 is a view in side elevation showing an embodiment of the invention with the parts arranged for working the ground as the handle is pushed forwardly;

Fig. 2 is a similar view but showing the parts of the hoe arranged for working the ground as the hoe is pulled rearwardly;

Fig. 3 is a plan view looking down on the hoe arranged as shown in Fig. 1; and

Fig. 4 is a vertical section taken on the line 4—4 of Fig. 1 as indicated by the arrows.

Referring to the drawing, in accordance with the present invention an elongated handle 5 is provided of the usual type for hoes, rakes, etc. and this handle at its lower end has secured thereto a ferrule 6 to which an open ended socket 7 is secured as by welding or the like. The socket 7 is preferably provided with a rectangular opening therein and the socket is preferably set at an acute angle relative to the ferrule 6 and handle 5 at an angle of approximately 35°.

Loosely received within an opening in the socket 7 and projecting therethrough is a curved shank 8 preferably of square shape in cross section. Assembled as shown in Fig. 1 the concave side of the shank 8 is disposed forwardly and the shank runs downwardly from the socket 7 and is secured to the underside of the central portion of a V-shaped blade 9. The forward edges of the two arms of this blade 9 are sharpened at their undersides at 10 and from the sharpened cutting edges the two arms of the blade 9 incline upwardly and rearwardly somewhat as viewed in Figs. 1, 3 and 4. At their two outer ends the arms of the blade 9 as viewed in Figs. 1 and 3 are turned upwardly and rearwardly and form up-turned wings 11 sharpened along their inclined advancing edges. Mounted in the socket 7 is a set screw 12 which can be tightened against the shank 8 to securely hold the shank in place within the socket 7 at a desired adjustment and prevent movement of the shank 8 and the blade 9 relative to the handle 5 and ferrule 6.

In using the hoe the concave side of the shank 8 may be disposed forwardly as shown in Figs. 1 and 3 and the set screw 12 may be tightened against the shank 8 after the socket 7 has been raised or lowered relative to the shank 8 to cause the handle 5 to take a variety of angles relative to the bottom or sharpened edge 10 of the blade 9. It should be noted that the sharpened edge 10 of the blade lies in a single plane and that the blade inclines upwardly and rearwardly from this edge in much the same manner as the mold board of a V-shaped snow plow. With the parts assembled as shown in Figs. 1 and 3 the handle 5 can be disposed at the proper angle to suit the height and convenience of the person using the hoe by reason of the curvature of the shank 8. As the parts are thus assembled the blade 9 can be pushed forwardly over the ground to either shave off weeds at the ground level or to penetrate into the ground and cultivate below the surface of the ground. For example, the hoe can be used along a row of growing plants A, as shown in Fig. 3, and the blade 9 can be worked along the row with one of the wings 11 located closely adjacent the plants A. As the hoe works into the ground, the wing 11 adjacent the row of plants will project slightly out of the ground and this wing will act as a gauge to locate the edge of the blade adjacent the row and thus prevent the operator from cutting into the plants A while permitting the operator to cultivate very close to the plants. By reason of the V construction of the blade 9, as the blade is pushed forwardly, the sharpened edge 10 produces a shearing cut which permits the hoe to readily work through the ground. Also the inclined edges of the the wings 11 produce a shearing cut and the inclination of the two arms of the blade and the inclination of the wings 11 produce a thorough mulching action.

As shown in Fig. 2 the shank 8 and blade 9 can be reversed from the position shown in Figs. 1 and 3 so that the concave portion of the shank is disposed rearwardly. When the parts are disposed as shown in Fig. 2 a highly efficient hoeing action can be obtained by digging the point of the blade 9 into the ground with a downward and rearward pulling action after the manner of use of a common hoe.

In planting row crops the hoe can be assembled as shown in Fig. 2 and worked over the ground to form a shallow trench for taking seeds, or the like, whereupon after the seeds have been planted the hoe can be reversed and assembled as shown in Figs. 1 and 3 and worked rearwardly over the planted ground and the two arms of the blade 9 will gather loose earth and work the same centrally to fill the seeded trench.

When the hoe is assembled as shown in Figs. 1 and 3 it can be very effectively used for cultivating shrubbery and the like, the construction of the hoe being such that access can be had to ground surfaces which are not readily accessible for cultivation with the ordinary type of hoe. Also as the hoe is assembled in Figs. 1 and 3 the hoe can be very nicely used to trim sod which has overgrown side walks and the like by pushing the hoe forwardly on the side walk with one of the wings 11 in alignment with the side walk. The cutting edge of the said wing will then shear off the overgrown sod to trim the walk nicely.

It will be seen that the hoe of the present invention has a great variety of uses and that a highly effective garden implement has been provided.

It will, of course, be understood that various changes may be made in the form, details, arrangement and proportions of the various parts without departure from the scope of the present invention which, generally stated, consists in the matter shown and described and set forth in the appended claim.

What is claimed is:

A reversible hoe comprising, an open-ended socket, a ferrule attached thereto, a handle mounted in said ferrule, a curved shank running through said socket, means for releasably securing said shank in a desired position to said socket, a V-shaped blade centrally secured at its underside to one end of said shank, the two arms of said blade having sharpened forward edges and projecting diagonally upwardly and rearwardly from said edges, and a pair of upturned wings at the ends of the arms of said blade.

SIDNEY A. BROWNSEY.